United States Patent

[11] 3,619,621

[72] Inventor Gerard Maret
Caen, France
[21] Appl. No. 775,781
[22] Filed Nov. 14, 1968
[45] Patented Nov. 9, 1971
[73] Assignee U.S. Philips Corporation
New York, N.Y.
[32] Priority Nov. 14, 1967
[33] France
[31] 128112

[54] RADIATION DETECTORS HAVING LATERAL PHOTOVOLTAGE AND METHOD OF MANUFACTURING THE SAME
7 Claims, 7 Drawing Figs.

[52] U.S. Cl. .......... 250/211, 250/83.3
[51] Int. Cl. .......... G01t 1/24
[50] Field of Search .......... 250/83, 83.3, 211, 211 J; 317/235 (27)

[56] References Cited

UNITED STATES PATENTS

| | | | |
|---|---|---|---|
| 3,117,229 | 1/1964 | Friedland .......... | 250/83.3 |
| 3,207,902 | 9/1965 | Sandborg .......... | 250/83.3 |
| 3,225,198 | 12/1965 | Mayer .......... | 250/83.3 |
| 2,959,681 | 11/1960 | Noyce .......... | 250/211 |

*Primary Examiner*—James W. Lawrence
*Assistant Examiner*—Davis L. Willis
*Attorney*—Frank R. Trifari

ABSTRACT: A radiation detector is described utilizing the lateral photovoltage effect. It comprises a semiconductor body having parallel to its major surface there zones alternating in conductivity type forming two PN-junctions, which become back biased during operation. The middle zone is accessible at a major surface and two contacts are made to it, with the result that the potential difference existing across these contacts is an indication of the point of impact of the incident radiation. The construction described of three zones forming two junctions offers the advantage of increasing the useful volume of the detector and increasing its sensitivity.

INVENTOR.
GERARD MARET
BY
AGENT

INVENTOR.
GERARD MARET
BY
Frank R. Trifari
AGENT

INVENTOR.
GERARD MARET
BY
Frank R. [signature]
AGENT

RADIATION DETECTORS HAVING LATERAL PHOTOVOLTAGE AND METHOD OF MANUFACTURING THE SAME

The invention relates to a radiation detector comprising a semiconductor body having two substantially parallel major surfaces and having two layers of different electric properties, which are separated from each other by a junction for converting radiation energy into electric signals, extending substantially parallel to the major surfaces, one of which layers being provided at one of the two major surfaces with at least two-spaced electrodes.

It is known that such detectors in which the lateral photovoltage effect is utilized permit of localizing the points of impact of the incident radiation. The detecting junction of these position-sensitive detectors may be a junction between two zones of opposite conductivity types or a junction between two zones of the same conductivity type but having different resistivity. When radiation impinges on the detector, the potential difference between the electrodes permits of localizing the point of impact.

The simplest embodiment of these detectors, which provide information about the point of impact only in one coordinate direction, has an elongated, rectangular shape and is provided on one major face with two electrodes in the form of narrow, elongated contacts, extending parallel to the short sides of the rectangle. The invention will be described with reference to this type of detectors, but it should be noted that the invention also relates to detectors having geometrically different contacts.

These detectors having lateral photovoltage are employed for the localization of the point of impact of electromagnetic or particle radiation. The constructions of these detectors may be different according as they are used for detecting light radiation, for example, solar radiation or particle radiation.

Particularly in examining particle radiation it is often important to have a possibility of assessing both the energy and the point of impact of the particles. For this purpose a further electrode is provided usually by metallization on the major surface not provided with the two electrodes so that this electrode extends substantially over the whole surface. The radiation to be detected is incident to said major face and the further electrode serves both for obtaining a signal equal to the sum of the signals produced at the two first-mentioned electrodes and having opposite polarity, whilst its amplitude depends upon the energy of the detected particle, and for biassing the junction so that the thickness of the depletion zone and the resistance of the layer provided with the two electrodes may be varied.

It is furthermore known that in radiation detectors the electron-hole pairs generated in the semiconductor material at distances from the junctions exceeding the diffusion length $\lambda$ do not reach the junction and therefore do not contribute to the photoelectric effect, so that the efficiency of the detector is restricted. The volume of semiconductor material located at a distance from the junction smaller than $\lambda$ constitutes so to say the useful volume of the detector. This useful volume of the known detectors is equal to $S. \lambda$, wherein S designates the area of the junction.

The present invention has for its object to provide a detector having lateral photovoltage effect whose efficiency is considerably higher than that of the known detectors.

According to the invention the radiation detector of the kind set forth is characterized in that the semiconductor body has at least two junctions for converting radiation into electric signals the body having at least three consecutive layers of different electric properties, whilst at the position of the electrodes the intermediate layer extends up to the one major surface and the outer layer adjacent the one major surface is located at least for the major part between the two electrodes and is partially transparent for the radiation to be detected.

One junction or both junctions for converting radiation into electric signals may be junctions of the Schottky type.

The two junctions for converting radiation into electric signals are preferably PN-junctions the two outer layers being of the one conductivity type and the intermediate layer being of the other conductivity type.

The invention has the advantage that the sensitivity of the detectors is considerably increased, whilst the useful volume is enlarged.

As stated above, the useful volume of the known detectors having a single junction of a area S is equal to $\lambda.S$, wherein $\lambda$ designates the diffusion length. In the detector according to the invention, the useful volume is practically trebled, other dimensions being the same, since not only a useful volume is obtained along the junction between the intermediate layer and the outer layer facing the radiation, which volume is approximately equal to $\lambda.S$, (the surface of the two electrodes being neglected) but also a further useful volume equal to $2\cdot\lambda.S$ located on either side of the junction between said intermediate layer and the outer layer remote from the incident radiation.

If it is desired to have a possibility of biassing the junctions between the layers of opposite conductivity types, contact electrodes are provided on more or less large regions of the two major faces of the semiconductor body in connection with the two outer layers of the body.

The detector according to the invention may be connected so that the two electrodes of the intermediate layer are connected to a measuring instrument for measuring the potential difference between these electrodes. The outer layers need not be connected to a voltage source. The outer layers then are at a so-called floating potential.

Such a construction has the advantage that the detector may be used without any voltage supply.

The detector according to the invention may be connected as an alternative so that in addition the two junctions are slightly biassed in the reverse direction with the aid of one or more voltage sources. Such a construction has the advantage that the output signal level and the sensitivity of the device are increased.

In order to manufacture a radiation detector according to the invention a single-crystal semiconductor substrate of the one conductivity type may be provided with an epitaxial layer of the other conductivity type, a surface layer of the one conductivity type being provided by diffusion from the free surface of the epitaxial layer. The detector obtains its required mechanical rigidity from the substrate, whereas the epitaxial layer may be comparatively thin.

In these detectors the epitaxial layer comprises the region where the majority of the electron-hole pairs occurs. This provides the advantage that an intermediate layer of more uniform thickness and of very satisfactory homogeneity of the dopant concentration can be obtained, as a result of which a linear characteristic curve and hence a higher measuring accuracy are achieved.

The radiation detector according to the invention may furthermore be obtained by growing on a single-crystal semiconductor substrate of the other conductivity type an epitaxial layer of the one conductivity type, the substrate being subsequently thinned by grinding and etching, a surface layer of the one conductivity type being provided by local diffusion from the free surface of the substrate. The substrate then preferably has a resistivity of less than 40 to 50 ohm cm. The required rigidity is in this case obtained from the comparatively thick epitaxial layer.

This method has the advantage that the intermediate layer, that is the region in which the majority of the electron-hole pairs occurs, may have a high crystal quality so that an increase in diffusion length and hence an enlargement of the useful volume and an improvement in sensitivity result.

The invention will now be described more fully with reference to the accompanying drawing.

Figure 1:
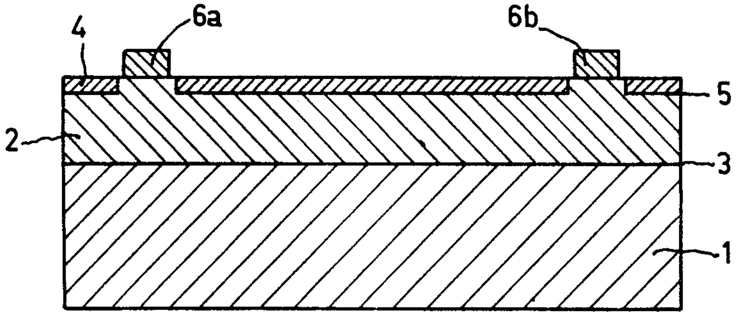
FIG. 1 is a schematic sectional view of a detector in accordance with the invention.
Figure 2:
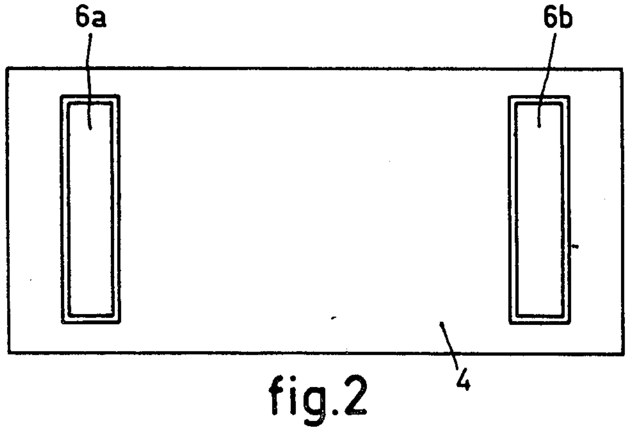
FIG. 2 is a schematic plan view of the detector of FIG. 1.

The detector shown in FIGS. 1 and 2 comprises two substantially parallel junctions 3 and 5. A substrate 1 of the one conductivity type having a high dopant concentration and hence a low resistivity and an adequate thickness to provide the desired mechanical rigidity of the detector is provided with an epitaxial layer 2 of the other conductivity type to a thickness of a few tens of a micron, forming the first junction 3. The surface of the layer 2 is provided with a layer 4 of the one conductivity type by diffusion, which forms the second junction 5. The diffused layer has to be thin so that the particles to be detected produce a high signal, whilst the geometry has to be such that contacts can be readily provided on the layer 2 by means of electrodes 6*a* and 6*b*.

When in a device comprising such a detector the junctions have to be biassed in the reverse direction by applying a voltage, an electrode has to be provided, as stated above, on the substrate 1 and an electrode has to be provided on the layer 4.

Such a detector may be obtained by providing an N-type silicon substrate 1 with a P-type layer of a thickness of 50$\mu$ by a known epitaxial method, boron forming the dopant, for example, from a $B_2H_6$ source. Then phosphorus forms, for example, the compound $P_2O_5$ is diffused into the layer 2, after the zones intended for the electrodes 6*a* and 6*b* have been masked. By this diffusion a thin N-type layer 4 of for example 0.5 $\mu$m is formed. The electrodes 6*a* and 6*b* are then obtained by a known metallization method.

The resistivity of the useful zone 2 may be a few tens of ohm cm., that of the substrate 1, for example, about 0.1 ohm cm. and that of the diffused layer 4, for example, about 0.3 ohm cm.

The advantages of such a method reside in the homogeneity of the impurity concentration, in the uniformity of the thickness and the resistivity of the epitaxial layer, which results in a linear characteristic curve.

Figure 3:
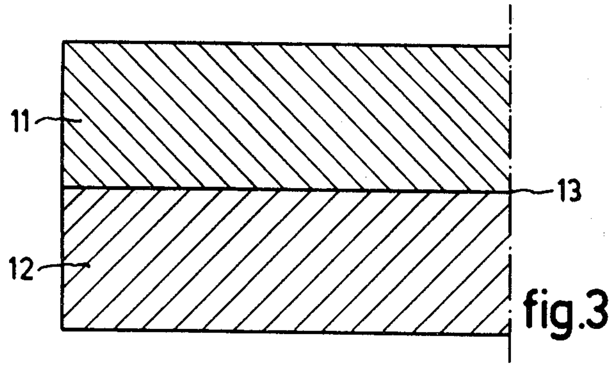
FIG. 3 and 4 illustrate schematically two stages of a method of manufacturing a detector in accordance with the invention.
Figure 4:
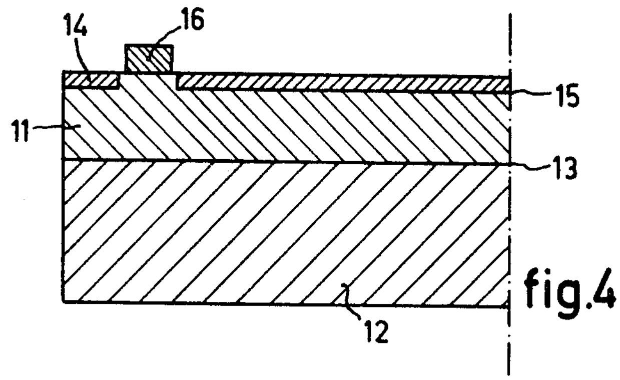

The detector shown in FIGS. 1 and 2 may as an alternative be obtained in a different manner; an example thereof will be described with reference to FIGS. 3 and 4. One surface of the substrate 11 (corresponding with the layer 2) of P-type conductivity and of high crystal quality and having a resistivity of 40 to 50 ohm cm. and a great thickness is provided epitaxially with an N-type layer 12 (corresponding with the layer 1) of a thickness of at least 100 $\mu$, which provides the mechanical rigidity of the detector and which forms with the P-type layer a junction 13 (equal to the junction 3). Then the opposite face of the substrate 11 is mechanically ground off to 50 $\mu$ and chemically etched and this face is provided with an N-type layer 14 (equal to the layer 4) by diffusion so that a junction 15 (equal to the junction 5) is obtained. The diffusion of the layer 14 and the provision of the contacts 16 are carried out as stated above.

The advantage of this method resides in the high crystal quality of the P-type substrate and in the possibility of choice of the resistivity in a wide range, so that greater diffusion lengths, a larger useful volume, a higher photocurrent and hence an increase in sensitivity are obtained.

Figure 5:
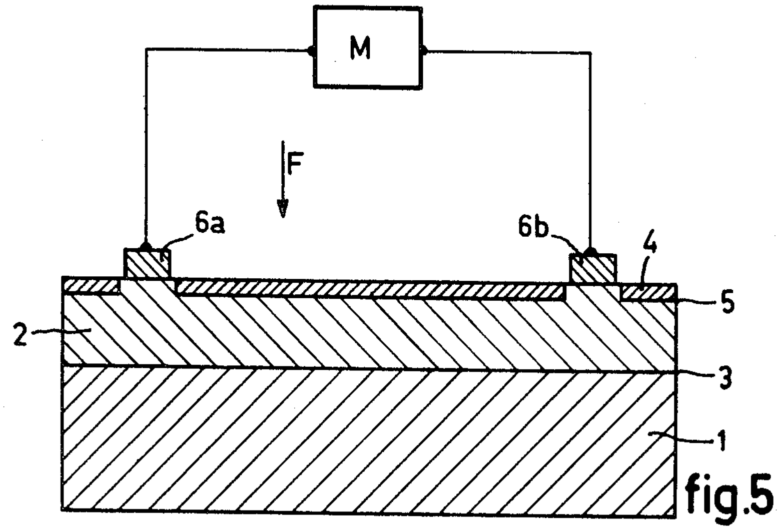
FIG. 5 shows an example of a device comprising a detector in accordance with the invention.

FIG. 5 shows a diagram of a circuitry using the detector shown in FIGS. 1 and 2. The radiation is incident in the direction indicated by the arrow F.

It is known that even in the absence of a bias voltage a depletion zone is formed at the junctions; the electron-hole pairs produced in the useful volume of the layers 1 and 2 can thus be separated. When these pairs are produced in the useful volume of the layer 1 the electrons stay in the layer 1, whereas the holes travel along the junction in the layer 2. The excess holes are reinjected into the layer 1 at a given distance from the point of impact and attract the electrons left in the layer 1. If the electron-hole pairs are produced in the useful volume of the layer 2, the holes are left in this zone, whereas the electrons pass to the layers 1 and 4 and are distributed along the two junctions. The excess electrons return into the layer 2 at a given distance from the point of impact and attract the holes of the layer 2. Owing to the displacement of electrons and holes currents are produced on either side of the point of impact, which involve potential differences the values of which can be measured via the electrodes 6*a* and 6*b* by means of a measuring instrument M of the voltmeter type.

If necessary, the signals may be amplified and the measuring instrument may be adapted to the resistance between the electrodes 6*a* and 6*b*, which resistance is high owing to the high resistivity of the material of the layer 2.

The advantage of this use resides in the fact that no external voltage source is required.

Figure 6:
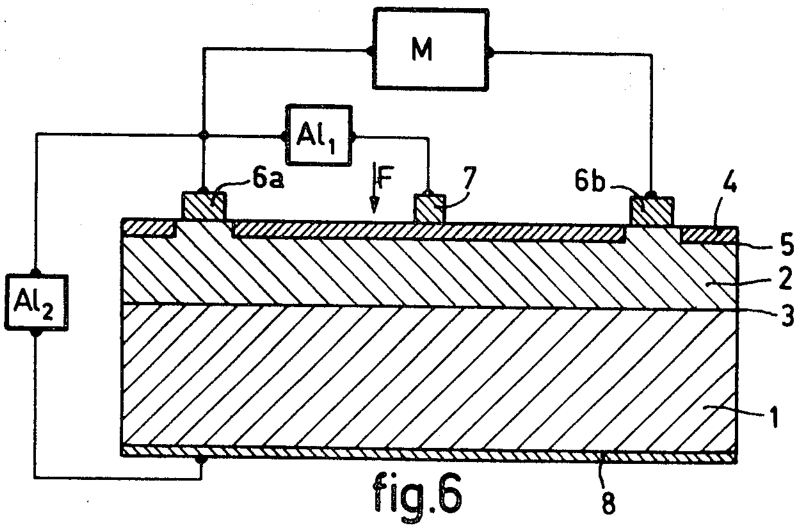
FIG. 6 and 7 show two further examples of devices comprising a detector in accordance with the invention.
Figure 7:
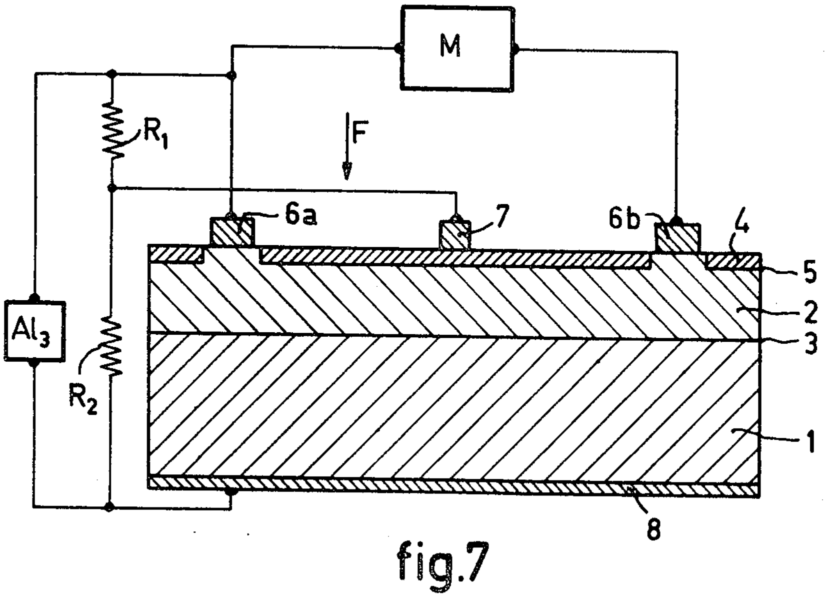

FIGS. 6 and 7 show schematically two circuit arrangements comprising a detector as shown in FIGS. 1 and 2, in which the two junctions 3 and 5 are biassed in the reverse direction, so that the thickness of the depletion zones can be enlarged. For this purpose first a contact 7 is applied to the diffused layer 4 and an electrode 8 to the substrate 1. In the circuit arrangement of FIG. 6 two voltage sources are employed, one of which ($Al_1$) is connected between one of the electrodes (for example, 6*a*) connected to the layer 2 and the contact 7 and the second of which ($Al_2$) is connected between one of the two last-mentioned electrodes 6*a* and 7 and the electrode 8. In the arrangement of FIG. 7 only one voltage source ($Al_3$) is employed, which is connected in parallel with a voltage divider $R_1$, $R_2$. The ends of this voltage divider are connected to the electrodes 6*a* and 8 respectively, whereas the tapping is connected to the contact 7. In both cases the measuring instrument M is connected between the electrodes 6*a* and 6*b*

Regardless of the circuit arrangement chosen a matching measuring instrument is employed for indication, which may be preceded by an amplifier. The applied voltages have to be low in order to avoid transgression of the breakdown voltage. Although two junctions are provided here, it should be noted that the device is not operative as a transistor, since the junctions are both biassed in the reverse direction.

The advantage of such a detector resides in an important increase in output level and in sensitivity.

By using equivalent other technical means variants of the embodiments described above may be designed by those skilled in the art within the scope of the present invention. Instead of one pair of electrodes, various pairs of electrodes may be provided on the intermediate layer so that information about the point of impact can be obtained on two coordinates. Moreover, other semiconductor materials such as germanium and $A^{III}$-$B^{V}$ compounds may be used.

What is claimed is:

1. A radiation detector utilizing the lateral photovoltage effect comprising a semiconductor body having opposed substantially parallel major surfaces, said body comprising at least first, second and third consecutive layers of different electrical properties forming at least two electrical junctions extending substantially parallel to the major surfaces, said first layer extending adjacent one major surface of the body, said second layer having spaced portions extending to the said one major surface, and electrode means on the said one major surface contacting the spaced portions of the second layer, said first layer being thinner than the second and third layers and being partly transparent for the radiation to be detected and extending at least for the major part between the electrode means, whereby the voltage developed between the electrode means is an indication of the point of incidence of the radiation.

2. A radiation detector as set forth in claim 1 wherein the first and third layers are of the one type conductivity and the second layer is of the opposite type conductivity forming two PN-junctions.

3. A detector as set forth in claim 2 wherein the first layer has a thickness of about 0.5$\mu$m, and the second layer has a thickness of about 50$\mu$m.

4. A detector as set forth in claim 2 wherein a contact is provided on the first layer and a contact is provided on the third layer.

5. A detector as set forth in claim 1 and including measuring means coupled to the electrode means for measuring the potential difference therebetween.

6. A detector as set forth in claim 5 and further including means for applying voltages to the layers such that both junctions are biased in the reverse direction.

7. A radiation detector as set forth in claim 1 wherein the second layer has a resistivity substantially higher than that of the first and third layers.

* * * * *